United States Patent [19]

Carnahan et al.

[11] Patent Number: 5,434,666
[45] Date of Patent: Jul. 18, 1995

[54] ACOUSTO-OPTIC SPECTRAL MANIPULATOR

[75] Inventors: Jon W. Carnahan, Sycamore; Brian A. Pelz, Crystal Lake, both of Ill.

[73] Assignee: Northern Illinois University, Debalb, Ill.

[21] Appl. No.: 201,642

[22] Filed: Feb. 25, 1994

[51] Int. Cl.[6] ............................................. G01J 3/18
[52] U.S. Cl. ...................................... 356/328; 356/334
[58] Field of Search ............... 356/308, 309, 326, 328, 356/334, 307; 372/20, 102

[56] References Cited

U.S. PATENT DOCUMENTS

| | | | |
|---|---|---|---|
| 4,028,636 | 6/1977 | Hughes | 372/102 |
| 4,120,586 | 10/1978 | Lessner | 356/334 |
| 5,039,855 | 8/1991 | Kemeny et al. | |
| 5,120,961 | 6/1992 | Levin et al. | |
| 5,131,742 | 7/1992 | Schaff | |
| 5,216,484 | 6/1993 | Chao et al. | |

Primary Examiner—F. L. Evans
Attorney, Agent, or Firm—Wood, Phillips, Van Santen, Clark & Mortimer

[57] ABSTRACT

A spectrometer is adapted to observe discrete wavelengths or spectral regions of a sample. The spectrometer includes a light source having spectral characteristics depending on the presence of a sample. A disperser consists of a chamber housing a diffraction grating in spaced relation to the light source and an entrance slit associated with the chamber for directing light from the source in a light path to be dispersed by the grating. An acousto-optic device is mounted in the chamber in the light path so that light traverses the device. A power supply applies an acoustic frequency to the acousto-optic device to set up a variation in refractive index within the acousto-optic device to deflect traversing light. A detector associated with the chamber is positioned relative to the grating to sense the presence of light where it appears after dispersion and to rapidly detect discrete wavelengths or spectral regions of the light.

16 Claims, 5 Drawing Sheets

ACOUSTO-OPTIC SPECTRAL MANIPULATOR

FIELD OF THE INVENTION

This invention relates to a spectrometer and, more particularly, to a spectrometer including an acousto-optic device in a light path of the spectrometer.

BACKGROUND OF THE INVENTION

Spectroscopy relates to absorption and emission of light, particularly as it relates to wavelength of the light. Natural light is composed of many colors in a spectrum. Often, it is necessary to analyze the spectrum to determine characteristics of the source of light. In use, spectroscopy requires that a source of light be dispersed so that different wavelengths of light are transmitted differently. A detector senses presence of light where it appears after dispersion and determines characteristics of the light. Various methods have been used to disperse the spectrum, including use of a prism or a diffraction grating. A prism disperses the light into its component colors using refraction. The diffraction grating includes a plurality of closely spaced slits on a flat surface.

In one particular form of a spectrometer, based on the Rowland circle principle, a circular chamber is provided. Light from a source is directed through a lens into an entrance slit in the chamber so that it is directed at a concave grating. The grating lies on a circumference of the circle. The diameter of the circle is equal to the radius of the curvature of the grating. As a result, the light is diffracted and imaged onto an arc of the circle.

In a particular application, the Rowland circle type spectrometer is used to observe discrete wavelengths or spectral regions of a sample. The sample is present in the light source. As a result, the light source has spectral characteristics depending on the presence or absence of the sample. An exit slit is provided in the circle so that light having a specific wavelength within the spectrum will exit the exit slit. The amount of light can be sensed by a detector such as a photomultiplier tube. This device is used to detect the presence of the sample in the light source based on the intensity at the particular wavelength being above a select level corresponding to the sample.

One problem with a conventional spectrometer as discussed above is that the light source often consists of a hot flame with a different type of gas. Flickering of the light causes problems due to constant changes in intensity. A small amount of the sample may be hard to distinguish from flickering. In prior devices, this problem has been solved by looking at the wavelength of interest relative to a closely related wavelength. The intensity of the two wavelengths are compared to determine the presence of the particular sample. This is often done using glass or quartz in the light path which is mechanically moved back and forth to shift the light so that the light sweeps past the exit slit. If the signals are different, then this indicates the presence of the sample. To be effective, though, the mechanical movement must be faster than natural fluctuations due to flicker and the like. However, quartz or glass tend to be quite heavy, rendering such mechanical movement difficult to achieve.

The present invention is directed to overcoming one or more of the problems discussed above in a novel and simple manner.

SUMMARY OF THE INVENTION

In accordance with the invention there is provided a spectrometer including an acousto-optic spectral manipulator.

It is an object to the invention to improve spectrometer technology to allow rapid observations of discrete wavelengths or spectral regions for tasks such as background correction, derivative spectrometry or spectral scanning.

Broadly, there is disclosed herein an improvement in a spectrometer adapted to observe discrete wavelengths or spectral regions of a sample. The spectrometer includes a light source having spectral characteristics depending on the presence of the sample. A disperser consists of a chamber having a diffraction grating in spaced relation to the light source and means associated with the chamber for directing light in a light path from the source onto the grating to be dispersed by the grating. A detector is associated with the chamber and positioned relative to the grating to sense the presence of light where it appears after dispersion and detect discrete wavelengths or spectral regions of the light. The improvement comprises an acousto-optic device mounted in the light path so that light traverses the device. Means apply an acoustic frequency to the acousto-optic device to set up a variation in refractive index within the acousto-optic device to allow rapid observations by the detector of discrete wavelengths or spectral regions of the light.

It is a feature of the invention that the applying means comprises a power supply which is alternately turned on and off.

It is another feature of the invention that the applying means comprises a power supply supplying modulating power to the acousto-optic device.

It is a further feature of the invention that the applying means comprises a power supply applying modulating frequency power to the acousto-optic device.

In accordance with another aspect there is disclosed a spectrometer adapted to observe discrete wavelengths or spectral regions of a sample. The spectrometer includes a light source having spectral characteristics depending on the presence of a sample. A disperser consists of a chamber having a diffraction grating in spaced relation to the light source and means associated with the chamber for directing light from the source in a light path to be dispersed by the grating. An acousto-optic device is mounted in the chamber in the light path so that light traverses the device. Means are provided for applying an acoustic frequency to the acousto-optic device to set up a variation in refractive index within the acousto-optic device to deflect traversing light. A detector associated with the chamber is positioned relative to the grating to sense the presence of light where it appears after dispersion and to rapidly detect discrete wavelengths or spectral regions of the light.

It is a feature of the invention that the directing means comprises an entrance slit in the chamber.

It is another feature of the invention that the directing means comprises means for focusing light.

It is a further feature of the invention that the directing means comprises means for collimating light.

It is yet another feature of the invention that the detector comprises an exit slit in the chamber for outputting a spectral line representing a select wavelength according to the position of the exit slit and the state of the acousto-optic device.

It is yet a further feature of the invention that the detector comprises a spectral-detector operatively associated with the exit slit for sensing light exiting the exit slit.

Further features and advantages of the invention will be readily apparent from the specification and from the drawing.

DETAILED DESCRIPTION OF THE INVENTION

Figure 1:
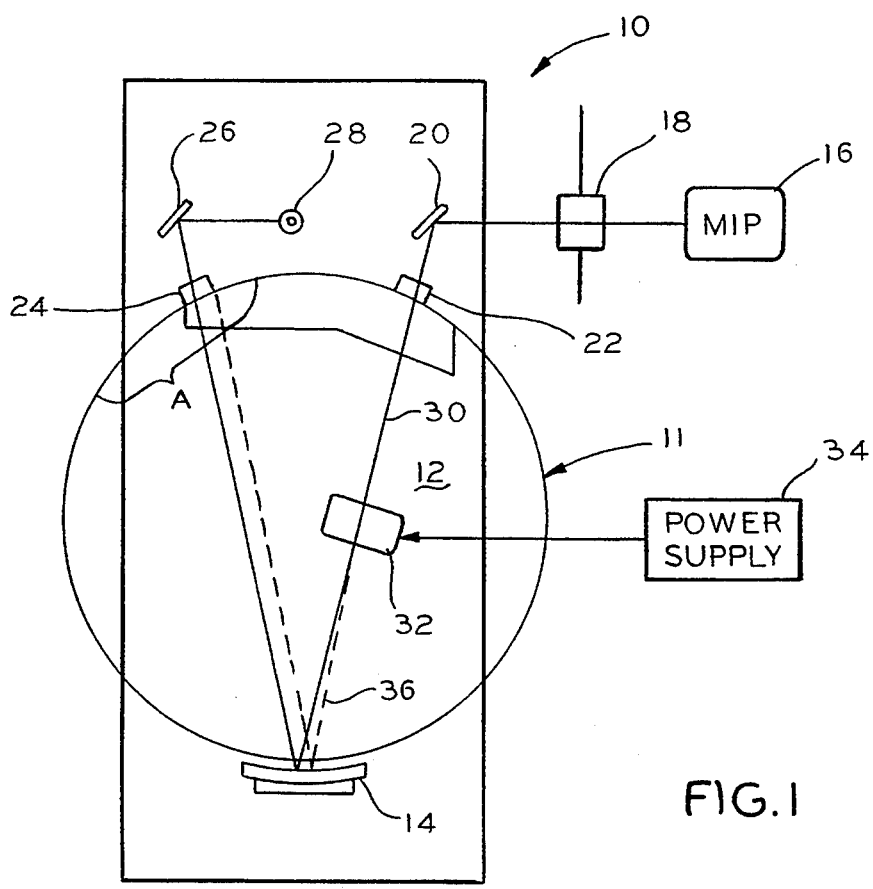
FIG. 1 is a generalized two-dimensional representation and block diagram of a spectrometer according to the invention.

Referring to FIG. 1, there is shown a two-dimensional representation of the configuration for a spectrometer 10 according to the invention. Particularly, the spectrometer 10 comprises a conventional spectrometer in one form including an acousto-optic spectral manipulator in accordance with the invention, as described below.

The spectrometer 10 may take many forms and the illustrated embodiment of the invention is based on the Rowland circle principle. The spectrometer 10 includes a chamber 12 defined by a wall represented by a circle 11 having a select diameter. A concave grating 14 of conventional construction lies on the circle 11. The grating 14 has a radius equal to the select diameter of the circle 11. A light source 16 directs light which is focused through a lens 18 and deflected with a mirror 20 through an entrance slit 22 into the chamber 12. The entrance slit 22 is positioned to direct light from the source 16 to the grating 14. The grating 14 disperses the light by diffraction onto a wide area of the circle 11 represented by the bracketed area A. An exit slit 24 is positioned on the circle 11 within the bracketed area A so light having a select wavelength from the diffraction grating 14 exits the slit 24. The light exiting the slit 24 is reflected off a mirror 26 to be received by a light detector, shown in FIG. 1 as a photomultiplier tube (PMT) 28. The photomultiplier tube 28 develops an electrical signal proportional to the light intensity sensed at the select wavelength.

The light source 16 may take any known form and in the illustrated embodiment of the invention comprises a microwave induced plasma (MIP). Particularly, the MIP 16 consists of an electrical discharge with a different type of gas. In a conventional application a sample is introduced into the MIP 16. As a result, the light produced by the MIP 16 has spectral characteristics depending on the presence of the sample. As is well known, different elements emit light at different wavelengths. The exit slit 24 is positioned for a particular wavelength. Thus, the light intensity detected by the photomultiplier 28 is function of the sample. If the sample emits light at the select wavelength, then that fact will be sensed by the photomultiplier tube 28 as an increased light intensity.

With a light source such as an MIP 16, a problem exists that due to the discharge flickering can occur. At deflections of the flicker the intensity of sensed light changes. As a result, a small amount of the sample may be hard to distinguish from the flicker. Prior spectrometers have attempted to resolve this problem by looking at the wavelength of interest relative to a nearby wavelength. This can be done by moving the position of the exit slit 24, the diffraction grating 14 or by moving a piece of glass or quartz in the light path to shift the light so that it sweeps past the exit slit. However, all of these options require some mechanical structure for their operation. Such mechanical structure is often not capable of reacting quickly enough to overcome the problems with flickering and the like discussed above.

Light entering the entrance slit 22 travels in a light path represented by a solid line 30 to the diffraction grating 14. The multiple wavelengths of light are then broken up into spectral light with the path 30 shown again in solid line between the diffraction grating 14 and the exit slit 24 being for the wavelength of interest.

In accordance with the invention, the above-described problems are resolved using an acousto-optic device 32 mounted in the chamber 12 in the light path 30 so that light traverses the acousto-optic device 32.

Particularly, the acousto-optic device 32 may comprise, for example, an ADM-40 acousto-optic deflector-modulator made by Interaction Corporation. The device 32 includes an optical material such as quartz, glass, or tellurium dioxide with an attached piezo electric crystal. The particular identified device operates at a center frequency of 40 MHz with 6.71 effective grooves per millimeter at 40 MHz, with a scan band width of 20 MHz and a scan sweep rate greater than 20 KHz. The optical wavelength range is 200–700 nm with a maximum diffraction efficiency of 85%. The optical aperture is 2×20 mm with a rise time of 170 ns (1.0 mm diameter) or 110 ns (0.65 mm diameter).

Figure 2:
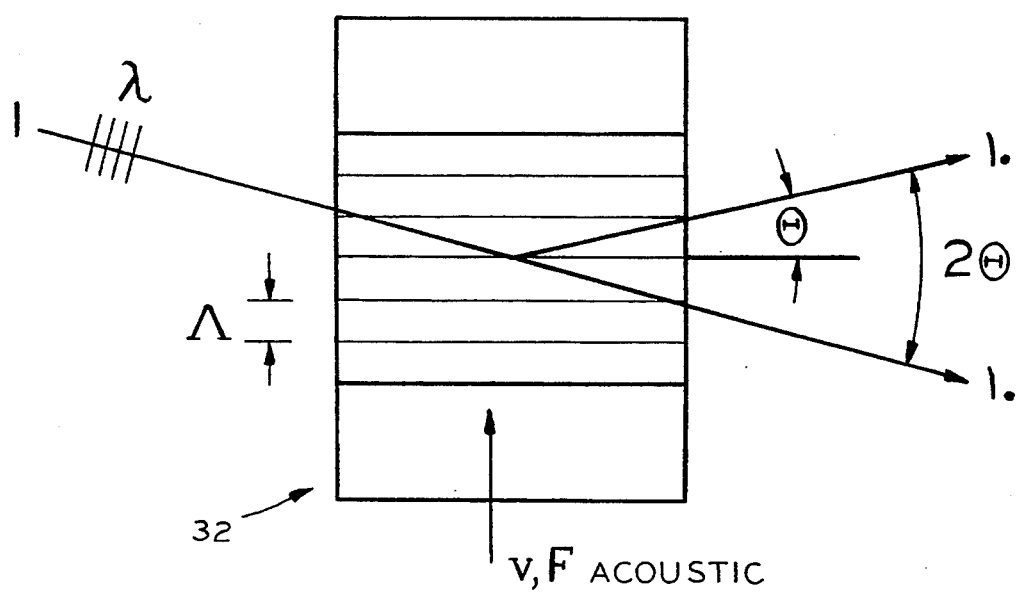
FIG. 2 illustrates position of an acousto-optic device in the spectrometer of FIG. 1.

With reference to FIG. 2, the acousto-optic device 32 is positioned in the light path so that light traverses the device 32 at or near the Bragg angle. The Bragg diffraction through the AOD 32 is determined in accordance with the following equation:

$$2\Theta = \frac{\lambda}{\Lambda} = \frac{\lambda F}{V}$$

Where $\Theta$ equals Bragg angle, $\lambda$ equals optical wavelength, $\Lambda$ equals acoustic wavelength, V equals acoustic velocity and F equals frequency.

For example, for 486 nm radiation at 40 MHz:
$\lambda = 486$ nm
$V = 5.96 \times 10^3$ m/s
$F = 40$ MHz
$\Lambda = 1.49 \times 10^{-4}$ m
$\Theta = 1.63 \times 10^{-3}$ Radians
$2\Theta = 3.26 \times 10^{-3}$ Radians.

The use of the AOD 32 provides the capability to monitor and manipulate data required in a modulated format. The rapidity of solid state spectrum manipulation and flexibility allows the user to choose the mode of operation. No mechanical manipulations are necessary so that the device does not require recalibration after initial installation.

The AOD 32 operates as a "spectral shifter" within the spectrometer 10. An acoustic frequency is applied to the AOD 32. This is done by a precisely driven and controlled high frequency power supply 34. The frequency sets up a variation in refractive index within the AOD 32 which behaves similarly to a transmission grating. Because the amplitude and exact frequency of the acoustic signal can be manipulated, the efficiency and angle of spectral shifting can be controlled.

In accordance with the invention, the operation of the power supply 34 can be controlled according to the desired mode of operation. Particularly, background correction can be provided by simply turning the power supply 34 on and off. With the power supply off, light traverses the light path 30 illustrated in solid line in FIG. 1. When the power supply 34 is turned on, then light is deflected by the AOD 32 to follow a path represented by a dashed line 36. As can be seen, the dashed line 36, i.e., the wavelength of interest does not pass through the exit slit 24. It hits the wall represented by the circle 11. Instead, a nearby wavelength passes through the exit slit. By alternating the power supply 34 on and off faster than fluctuation caused by flicker, appropriate background correction is provided.

Figure 3:
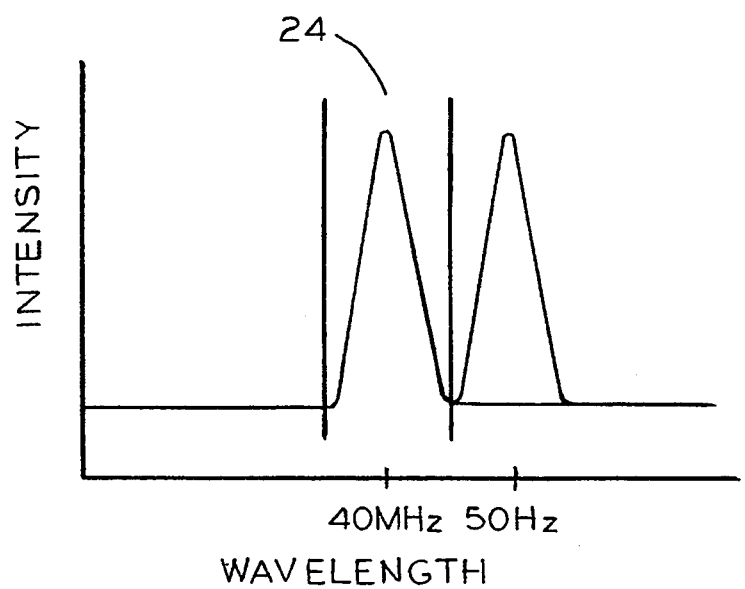
FIG. 3 is a curve representing change in wavelength in a frequency modulating system.
Figure 4:
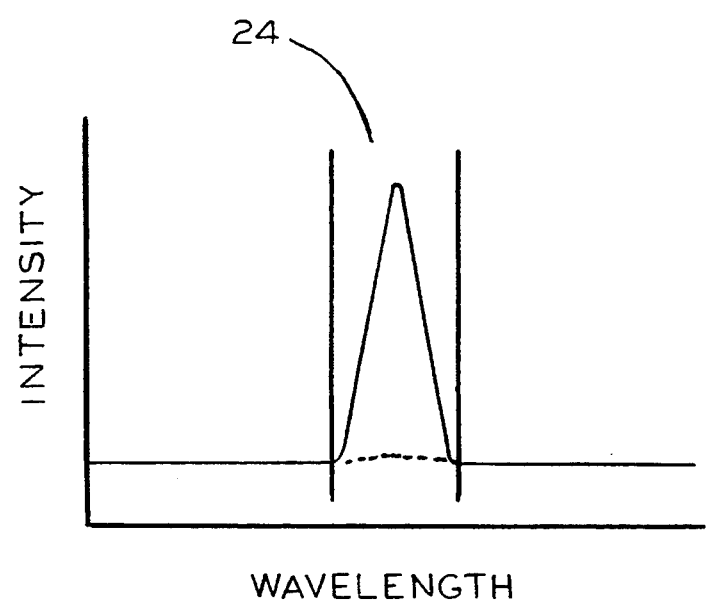
FIG. 4 is a curve representing change in wavelength in an amplitude modulating system.

In an alternative application, wavelengths within a spectral window may be accessed with a scanning function by frequency modulating the power supply 34. This operation is illustrated generally with reference to FIG. 3, which shows the position of the exit slit for receiving spectral light at a select wavelength of 40 MHz. When a 40–50 MHz shift occurs due to operation of the AOD, the peak intensity, illustrated in dashed line, does not exit the exit slit 24. Similarly, FIG. 4 illustrates an application in which amplitude modulation of the power supply 34 is implemented showing a much smaller peak in dashed line according to the amplitude of the power supply 34.

Figure 5:
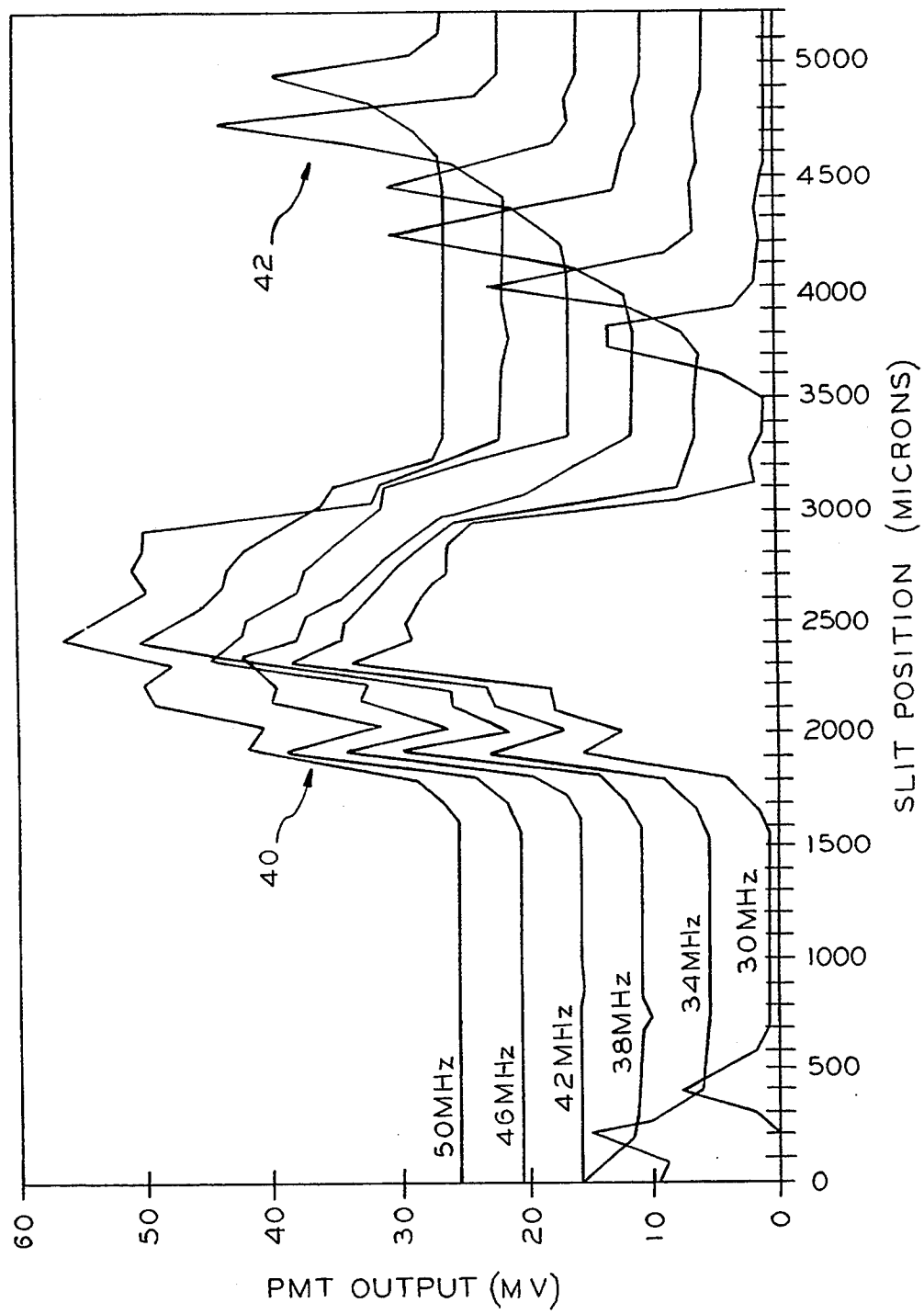
FIG. 5 is a series of curves representing slit position versus photomultiplier tube output.

With reference to FIG. 5, a series of curves illustrate PMT output in millivolts according to position of the exit slit 24 in microns at select acoustic frequencies of the AOD 32 driven by the power supply 34. The curve shows a first set of peaks 40 at approximately 1800 microns compared to a second set of peaks 42 beginning at approximately 3800 microns. As can be seen, the spacing between the fist set of peaks 40 and second set of peaks 42 is generally proportional to frequency. Thus, by shifting the acoustic frequency for driving the AOD 32, spectral shifting can be accomplished.

Figure 6:
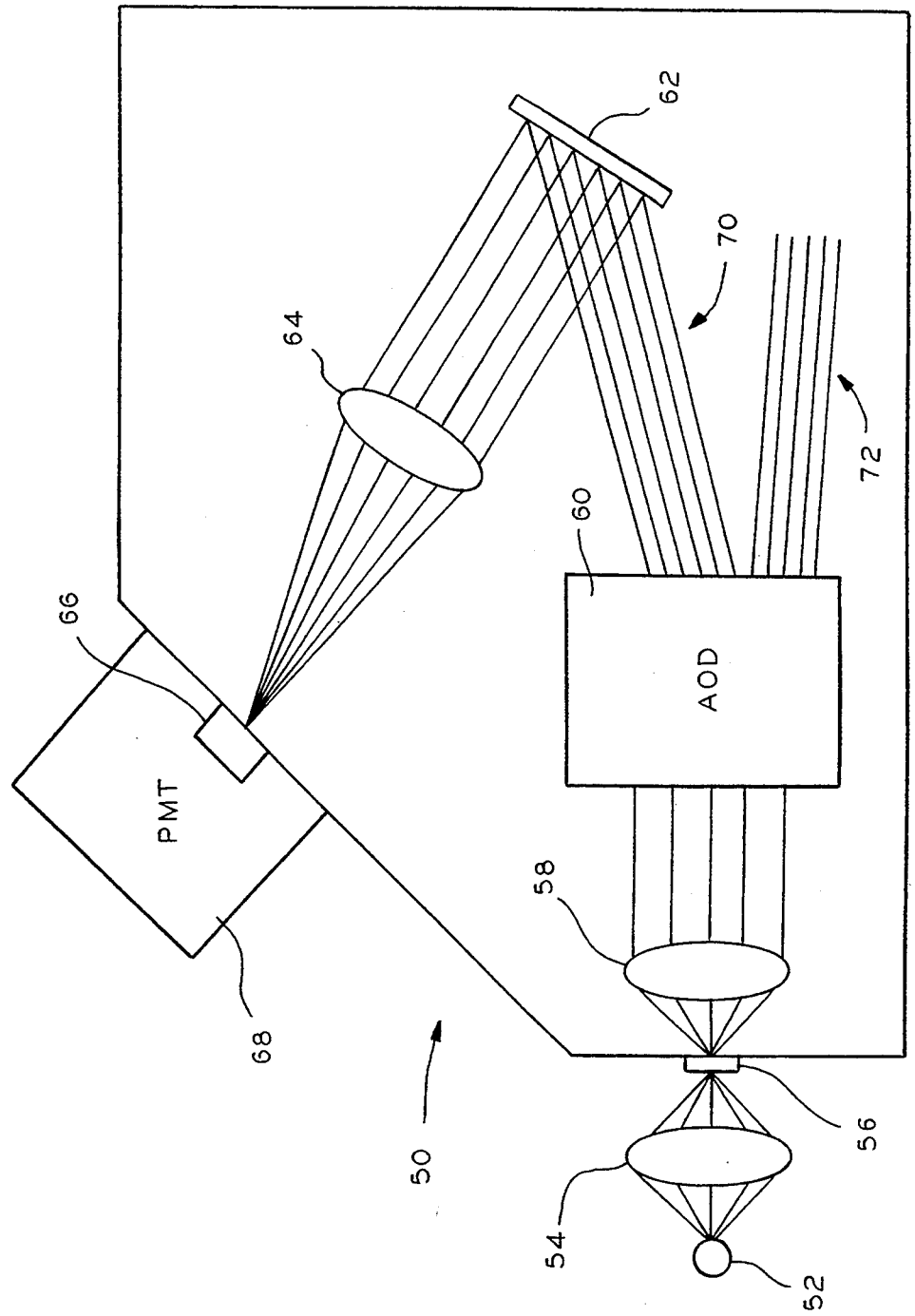
FIG. 6 is a generalized block diagram for an alternative embodiment of the invention.

With reference to FIG. 6, an alternative embodiment of a spectrometer in the form of a monochromator 50 is illustrated. The monochromator includes a light source 52 directing light through a focusing optic or lens 54 to an entrance slit 56. Light through the slit 56 is directed through a collimating optic 58 to an AOD 60, such as the AOD 32 discussed above. The collimated light is directed through the AOD 32 to a diffraction grating 62 and subsequently through a focusing optic 64 and exit slit 66 to a photomultiplier tube 68. In this application, the system is configured to view a select spectral wavelength. The AOD 60 when operated shifts the collimated light from the normal light path, illustrated in solid line 70, to a diverted light path illustrated in dashed lines 72.

Figure 7:
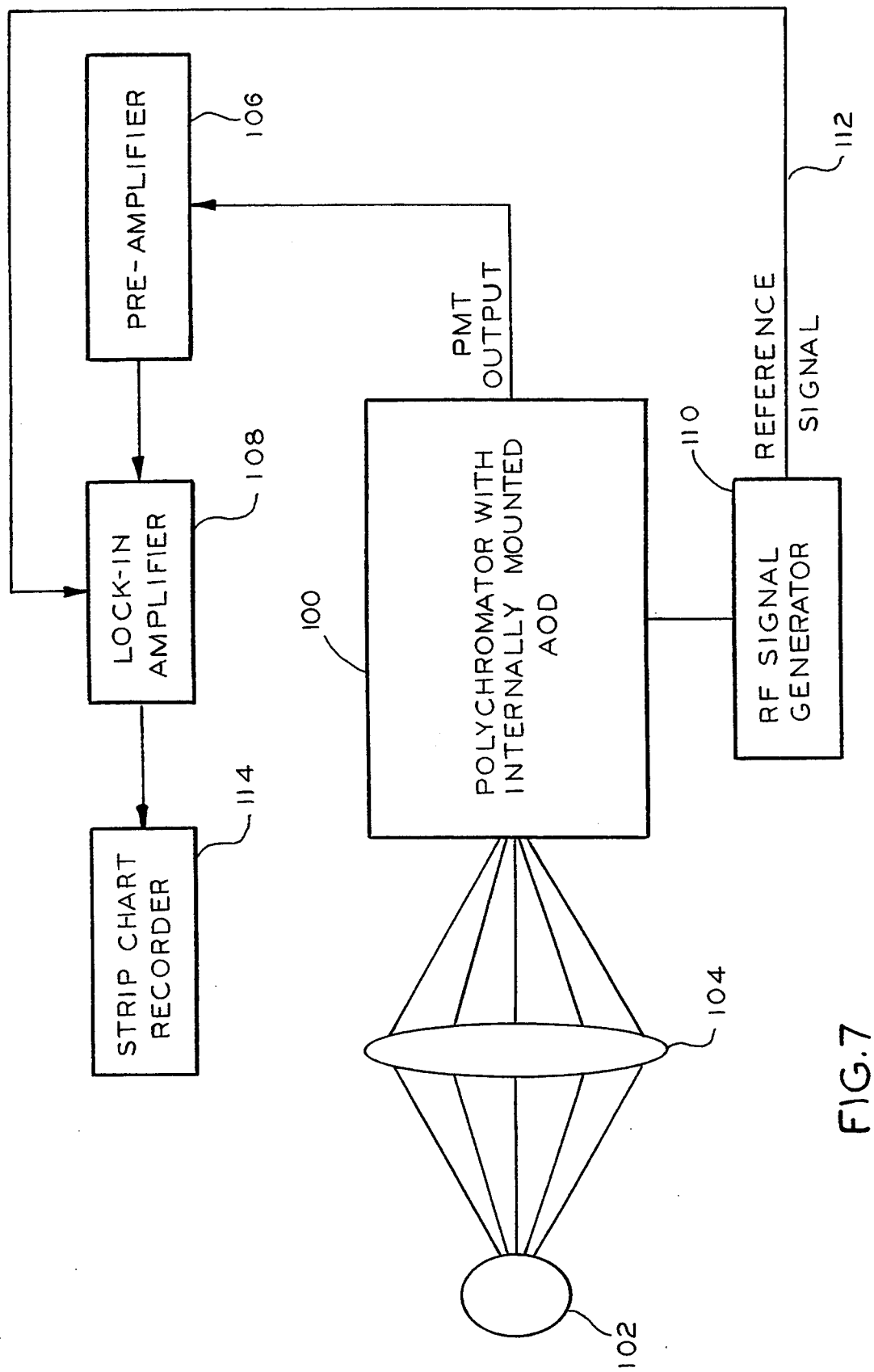
FIG. 7 is a block diagram of a spectrometer system according to yet another embodiment.

Referring to FIG. 7, a system block diagram is shown using a polychromator of conventional construction with an internally mounted AOD, as discussed above. In this application, fight from a source 102 is directed through a lens 104 to the polychromator 100. The internally mounted AOD, as discussed above, deflects light. A PMT output from a polychromator is directed to a preamplifier 106 which applies the amplified signal to a lock-in amplifier 108 which locks in response to a reference signal received from an RF signal generator 110. The RF signal generator also controls power applied to the AOD. The lock-in amplifier is used to differentiate signals according to the timing of the RF signal generator as represented by the reference signal on the line 112. The output from the lock-in amplifier 108 is provided to a strip chart recorder or computer or the like 114, as necessary for the particular application.

The use of an AOD in a spectrometer, as discussed above, results in a "solid state" spectral scanner having no mechanical parts and providing rapid response as wavelengths can be changed in microseconds. Wavelengths can be monitored discretely or in a specified spectral range. Because multiple wavelengths can be monitored essentially simultaneously, data may be manipulated with significantly less regard to time considerations. The device may be used with essentially any detector, allowing monitoring with optimal temporal-sensitivity considerations.

Thus, the invention broadly comprehends the use of an acousto-optic device in a light path in a spectrometer to detect discrete wavelengths or spectral regions of light.

We claim:

1. In a spectrometer adapted to observe discrete wavelengths or spectral regions of a sample, the spectrometer including a light source having spectral characteristics depending on the presence of the sample, a disperser consisting of a chamber having a diffraction grating in spaced relation to the light source and means associated with the chamber for directing light in a light path from the source on to the grating to be dispersed by the grating, and a detector associated with the chamber and positioned relative to the grating to sense the presence of light in the path where it appears after dispersion and detect discrete wavelengths or spectral regions of the light, the improvement comprising:
   an acousto-optic device mounted in the chamber in the light path so that light traverses the device; and
   means for applying an acoustic frequency to the acousto-optic device to set up a variation in refractive index within the acousto-optic device to allow rapid observations by the detector of discrete wavelengths or spectral regions of the light radiation.

2. The improvement of claim 1 wherein said applying means comprises a power supply which is alternately turned on and off.

3. The improvement of claim 1 wherein said applying means comprises a power supply supplying modulating power to the acousto-optic device.

4. The improvement of claim 1 wherein said applying means comprises a power supply supplying frequency modulating power to the acousto-optic device.

5. A spectrometer adapted to observe discrete wavelengths or spectral regions of a sample, comprising:
   a light source having spectral characteristics depending on the presence of a sample;
   a disperser consisting of a chamber having a diffraction grating in spaced relation to the light source and means associated with the chamber for directing light in a light path from the source on to the grating to be dispersed by the grating;

an acousto-optic device mounted in the chamber in the light path so that light traverses the device;

means for applying an acoustic frequency to the acousto-optic device to set up a variation in refractive index within the acousto-optic device to deflect traversing light; and a detector associated with the chamber and positioned relative to the grating to sense the presence of light where it appears after dispersion and to rapidly detect discrete wavelengths or spectral regions of the light.

6. The spectrometer of claim 5 wherein said applying means comprises a power supply which is alternately turned on and off.

7. The spectrometer of claim 5 wherein said applying means comprises a power supply supplying modulating power to the acousto-optic device.

8. The spectrometer of claim 5 wherein said directing means comprises an entrance slit in the chamber.

9. The spectrometer of claim 5 wherein said directing means comprises means for focusing light.

10. The spectrometer of claim 5 wherein said directing means comprises means for collimating light.

11. The spectrometer of claim 5 wherein said detector comprises an exit slit in the chamber for outputting a spectral line representing a select wavelength according to the position of the exit slit and the state of the acousto-optic device.

12. The spectrometer of claim 11 wherein said detector further comprises a photo multiplier operatively associated with the exit slit for sensing light exiting the exit slit.

13. The spectrometer of claim 11 wherein said applying means comprises a power supply which is alternately turned on and off to shift the select wavelength exiting the slit.

14. The spectrometer of claim 11 wherein said applying means comprises a power supply which is frequency modulated to shift the select wavelength exiting the slit.

15. The spectrometer of claim 11 wherein said applying means comprises a power supply which is amplitude modulated to shift the select wavelength exiting the slit.

16. The spectrometer of claim 5 wherein said applying means comprises a power supply modulating frequency to the acousto-optic device.

* * * * *